United States Patent Office 3,159,646
Patented Dec. 1, 1964

3,159,646
ALKENOYLAMIDO AND OXY PHENYLBENZO-
TRIAZOLES
Jerry P. Milionis and William B. Hardy, South Bound
Brook, and William F. Baitinger, Jr., Princeton, N.J.,
assignors to American Cyanamid Company, New York,
N.Y., a corporation of Maine
No Drawing. Filed Jan. 13, 1960, Ser. No. 2,129
8 Claims. (Cl. 260—308)

This invention relates to new monomers for the preparation of polymeric materials which also have the property of selectively absorbing ultraviolet light and to the copolymers thereof. More specifically, this invention relates to compounds of the formula

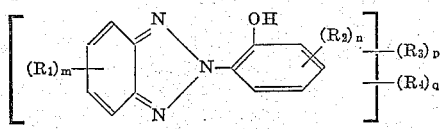

in which $R_1$ and $R_2$ may be lower alkyl, alkoxy, halogen, nitro, carboxy, sulfo, or sulfonamido, $R_3$ is alkenoylamino characterized by a polymerizable $CH_2=C<$ group, $R_4$ is alkenoyloxy characterized by a polymerizable $CH_2=C<$ group, $m$ and $n$ are each 0, 1 or 2 and $p$ and $q$ are 0, 1, 2 or 3, at least one of $p$ and $q$ being greater than zero, $R_3$ and $R_4$ being substituents on the carbocyclic, phenyl or benz rings. More specifically also, this invention relates to polymeric materials comprising polymers of the copolymerization of compounds having a $CH_2=C<$ polymerizable group and the phenylbenzotriazoles of the above description, and to polymerizable compositions of unsaturated polyester resins, a polymerizable monomer containing a polymerizable $CH_2=C<$ group and a different monomer selected from the above defined class of phenyl benzotriazoles.

The field of resin additives has seen, in the past few years, the development of a new type of additive, namely the ultraviolet absorber. These are compounds which selectively absorb incident ultraviolet light and re-emit the energy in the form of heat or sometimes visible light. They consequently, protect the resin material from photo decomposition.

A good ultraviolet absorber for use in plastics should absorb the ultraviolet in sunlight and at the same time be a colorless material by visual observation. The compound should impart no color to the plastic composition, should be sufficiently stable to undergo the conditions of curing of the plastic, and should absorb ultraviolet light sufficiently to protect the composition against yellowing and decomposition on exposure to ultraviolet light. Furthermore, the compound must have sufficient solubility in various types of materials so that it may be easily incorporated into various plastic formulations. This latter property is especially important, since an incompletely dispersed product would give poor protection.

Generally, an effective ultraviolet absorber should have its peak absorption above a wave length of 320 millimicrons. The absorption peak may be at a higher wave length, as long as absorption drops off sufficiently as it approaches the visual range so that no visible color is shown by the compound. In addition, to be effective, it should show a high degree of absorbancy in the desired wave length range. However, for the most desirable ultraviolet protection, the high absorbancy should be at those wave lengths sufficiently below the visual range so that the compound has no yellow color visually.

A further deficiency of commercial UV absorbers is that many show a tendency to be leached out of plastics by solvents or to be lost by evaporation during the hot molding and other heat treatments to which the plastics may be subjected. Not only does this cause a loss of protection, but also there are uses in which loss by leaching is especially undesirable. Among these is the protection of transparent plastic packages for food from discoloration. It is highly undesirable, e.g., for a plastic bag for an oleaginous food to have an ingredient which the oil in the food will dissolve out of the bag. Such containers are usually not approved for use with food. Other uses where such leaching is deleterious include plastic dishes and utensils as well as containers.

More recently there has been suggested ultraviolet absorbers which cointain copolymerizable groups. The original classes of ultraviolet absorbers were usually hydroxyalkoxy derivatives of benzophenone and more recently, benzotriazoles. The first suggestions of copolymerizable groups have been to replace the alkoxy group with an alkenyloxy or to place an alkenyl group on the ring of a benzophenone. These compounds have been found to copolymerize and to give protection to plastics in which they form in small amounts one of the comonomers. However, the copolymerization efficiency of such compounds has proved to be wholly inadequate. Very seldom does more than 15% of the alkenyloxy benzophenones actually become part of the polymeric chain. The remainder of the material added is easily leached out by solvent extraction. Since these compounds are expensive, such an inefficient copolymerization results in very expensive protection and it is often cheaper to use the conventional ultraviolet absorber which is a mere additive and not a comonomer.

We have found that 2-hydroxyphenylbenzotriazoles which carry, on either the phenyl ring or the benz ring of the benzotriazole moiety, either or both an alkenoylamino and an alkenoyloxy substituent are efficient comonomers and, as such provide extraordinary protection from incident ultraviolet light to polymeric materials in which they are copolymerized. The 2-hydroxyphenylbenzotriazoles which form our invention are described above and will be described below in more detail. We have also found that the copolymers of polymerizable ethylene compounds containing a $CH_2=C<$ polymerizable group with compounds of the above description are polymers of extraordinary stability to ultraviolet light.

The new comonomers of our invention are prepared by the reaction of amino and further hydroxy substituted 2-(hydroxyphenyl)benzotriazoles with an alkenoyl halide. A representative example of such a preparation is the reaction of 2(4-amino-2-hydroxyphenyl)benzotriazole with an acrylyl chloride as shown by the following equation:

(1)

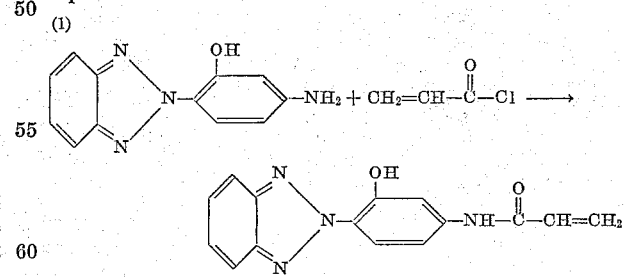

The alkenoyl halides which may be used in the preparation of the products of our invention include the acid chloride and the acid bromides of any alkenoic acid which has a polymerizable $CH_2=C<$ group. Among the alkenoic acids which may be used can be mentioned acrylic acid, methacrylic acid, and undecylenic acid. Of these compounds, of course, the simpler and more available examples such as acrylic acid, and methacrylic acid are to be preferred.

The aminobenzotriazoles which may be used to form the amide types of comonomer within the scope of our invention have been described by Boyle and Milionis in their copending application Serial No. 819,536, filed June 11, 1959, now U.S. Patent 3,055,896. These aminobenzotriazole intermediates used in our invention are amino-2-hydroxyarylbenzotriazoles in which the amino group can be on the 2-aryl radical or on the benz ring. Either ring may be further substituted by chloro, bromo, sulfonamido, nitro, carboxy, alkoxy or alkyl.

These compounds are prepared by one of two ways, depending on where the amino group is to be. When the amino group is to be on the benzotriazole portion of the molecule, an o-aminophenol is diazotized and coupled into a meta phenylenediamine. The coupling takes place para to one of the amino groups and the resulting o-aminoazo body is then triazolized by oxidation in the usual manner. This synthesis can be illustrated by the following preparation of the simplest member of the series:

(2)
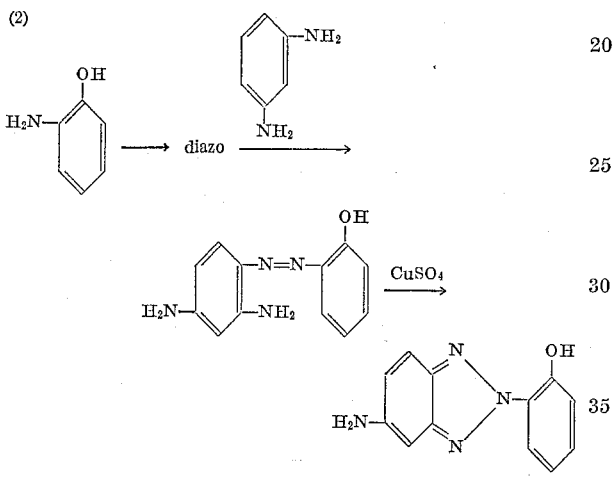

The o-aminophenols which can be used in this synthesis include o-aminophenol and any of its chloro, bromo, sulfonamide, sulfonic acid, carboxylic acid, alkoxy or alkyl derivatives such as 2-amino-4-chlorophenol
2-amino-4-bromophenol
2-amino-3,5-dibromophenol
2-amino-4,6-dichlorophenol
2-amino-4,6-dibromophenol
2-amino-4-nitrophenol
2-amino-5-nitrophenol
2-amino-6-nitrophenol
2-amino-6-chloro-4-nitrophenol
2-amino-4-chloro-5-nitrophenol
2-amino-6-bromo-4-nitrophenol
2-amino-4-bromo-6-nitrophenol
2-amino-4,6-dinitrophenol
2-amino-6-methylphenol
2-amino-4-methylphenol
2-amino-6-methyl-4-bromophenol
2-amino-4-nitro-6-methylphenol
2-amino-5,6-dimethylphenol
2-amino-4,6-dimethylphenol
2-amino-4,6-dimethylphenol
2-amino-5-methoxyphenol
2-amino-5-ethoxyphenol
2-amino-5-methylresorcinol
6-amino-4-methylresorcinol
6-amino-2-methylresorcinol
2-amino-3-hydroxybenzoic acid
3-amino-4-hydroxybenzoic acid
4-amino-3-hydroxybenzoic acid
3-amino-4-hydroxybenzene sulfonic acid
3-amino-4-hydroxy-6-chlorobenzene sulfonic acid
3-amino-4-hydroxy-5-methylbenzene sulfonic acid
4-amino-5-hydroxy-2-methylbenzene sulfonic acid
3-amino-2-hydroxy-5-methylbenzene sulfonic acid
3-amino-2-hydroxy-5-chlorobenzene sulfonic acid
3-amino-2-hydroxy-5-nitrobenzene sulfonic acid
4-amino-3-hydroxybenzene sulfonic acid
3-amino-4-hydroxybenzene sulfonamide
4-aminoresorcinol The phenylene diamines usable in this synthesis include both m-phenylenediamine and its derivatives. A position ortho to one amino must be substituted and must bear such relation to the other substituents that coupling will take place there. Phenylenediamines which are usable include:

Methaphenylenediamine
1,3-diamino-2-chlorobenzene
1,3-diamino-4-chlorobenzene
1,3-diamino-5-chlorobenzene
1,3-diamino-2,5-dichlorobenzene
1,3-diamino-4-bromobenzene
1,3-diamino-5-bromobenzene
2,4-diaminotoluene
2,6-diaminotoluene
2,4-diaminometaxylene
3,5-diaminoanisole
2,4-diaminoanisole
2,4-diaminophenetole When the amino group is to be in the 2-aryl radical, a different synthesis is used. An o-nitroaniline is diazotized and coupled with an aminophenol under conditions in which coupling takes place ortho to the phenol group. This ordinarily means, in the benzene series, a m- or p-amino phenol. In the naphthalene series, one must use an aminonaphthol in which the amino group is preferably in the other ring. The ortho nitro group is then reduced. Triazolization occurs by the reduction. An example of such a synthesis is the following:

(3)
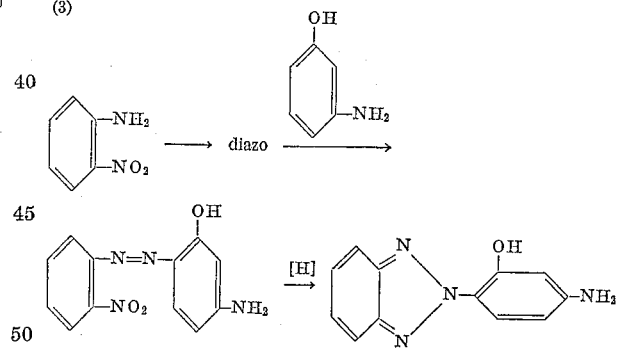

The nitroanilines which may be used include

Ortho-nitroaniline
6-methoxy-2-nitroaniline
6-ethoxy-2-nitroaniline
5-hydroxy-2-nitroaniline
5-methoxy-2-nitroaniline
4-hydroxy-2-nitroaniline
4-methoxy-2-nitroaniline
4-ethoxy-2-nitroaniline
3-nitroanthranilic acid
2-nitro-3-aminobenzoic acid
3-nitro-4-aminobenzoic acid
4-nitro-3-aminobenzoic acid
3-nitrosulfanilic acid
3-nitrosulfanilamide
2-nitro-4-chloroaniline
2-nitro-5-chloroaniline
2-nitro-3,6-dichloroaniline
2-nitro-4,5-dichloroaniline
2-nitro-4,6-dichloroaniline
2-nitro-5,6-dichloroaniline
2-nitro-3,4,6-trichloroaniline
2-nitro-4-bromoaniline
2-nitro-5-bromoaniline 2-nitro-6-bromoaniline
2-nitro-4-bromo-5-chloroaniline
2-nitro-4-bromo-6-chloroaniline
2-nitro-4-chloro-6-bromoaniline
2-nitro-4-iodoaniline
2-nitro-5-iodoaniline
2-nitro-4,6-diiodoaniline
2,4-dinitroaniline
2-nitro-meta-toluidine
4-nitro-meta-toluidine
3-nitro-para-toluidine The aminophenols usable in this synthesis include:

3-aminophenol
2-methyl-3-aminophenol
4-methyl-3-aminophenol
2-chloro-3-aminophenol
4-ethoxy-3-aminophenol
5-aminoresorcinol
4-aminophenol
2-methyl-4-aminophenol
3-methyl-4-aminophenol
3,5-dichloro-4-aminophenol
2-chloro-4-aminophenol
2-bromo-4-aminophenol
3,5-dimethyl-4-aminophenol
3-methoxy-4-aminophenol
4-ethoxy-4-aminophenol A third synthesis of such aminobenzotriazoles uses 2,4-dinitroaniline as a starting material. This is diazotized and coupled to a para substituted phenol having an ortho position open. The nitro groups are then reduced which forms the triazole ring and the amino group on the benzo ring. This method is thus usable for this type of compound only. The phenols which can be used as coupling components include phenols and their alkyl, alkoxy, chloro, or bromo derivatives such as:

4-chlorophenol
Para-cresol
4-tert-butyl-ortho-cresol
2-tert-butyl-para-cresol
Para-tert-butylphenol
4-chloro-meta-cresol
2-chloro-para-cresol
5-chloro-2-hyrdoxybenzenesulfonic acid
4-chlororesorcinol
5-chlorosalicylaldehyde
Para-methoxyphenol
Para-ethoxyphenol
Para-butoxyphenol
Para-benzyloxyphenol
Para-lauroxyphenol
2,4-dimethylphenol The hydroxy substituted triazoles used to prepare the ester class in our invention are prepared similarly using the proper hydroxy substituted compounds. Thus to introduce an additional hydroxyl into the 2-phenyl ring so that there will be a hydroxyl to esterefy, the ortho nitroaniline is diazotized and coupled with the proper polyhydroxy substituted benzene such as resorcinol, hydroquinone, hydroxyhydroquinone, phloroglucinol, 1,2,3,5-tetrahydroxybenzene and the like. The same type of compounds can be obtained by the diazotization of a 2,4-dihydroxyaniline and coupling into an aniline derivative as described in a manner similar to the first synthesis of amino derivatives described (Equation 2 above). Hydroxyl groups are introduced into the benz ring of the benzotriazole moiety by starting with the proper hydroxynitroaniline and coupling with a properly substituted phenol. If a polyhydric phenol such as resorcinol is used as the coupling component, the intermediate which is prepared will have a hydroxyl group on both the phenyl ring and the benz ring. Polyhydroxy compounds of this type may have two esterifiable hydroxyls on the phenol ring as well as one on the benz ring, provided a trihydroxy benzene is used as the coupling component.

Mixed types having both an amide and an ester derivative of the alkanoic acid are further within the contemplation of our invention. The intermediates for these are prepared by coupling a hydroxy-2-nitroaniline with a meta or paraaminophenol, or a polyhydroxy aniline such as 2-amino-5-methylresorcinol with a metaphenylenediamine in a reaction similar to that illustrated by Equation 2 above.

The new esters and amides of our invention can be incorporated in resins and plastics like any other UV absorber to give good protection. However, an especially important feature of our invention lies in the ability to copolymerize well with the monomers for the various plastics and thus become an integral part of the resin molecule. Such copolymerization can be carried out with any monomer containing ethylenic double bonds, such as ethylene, propylene, butylene, styrene, methyl styrene, ethyl styrene, propyl styrene, etc., acrylic acid and its amide, methacrylic acid, acrylonitrile, vinyl esters such as vinyl acetate and chloride, vinyl ethers such as vinyl butyral, dienes such as butadiene, isoprene, chlorobutadiene and such compounds.

They can also be included with unsaturated modifiers of polyester resins such as are described in U.S. 2,255,313, U.S. 2,443,735, U.S. 2,443,736, U.S. 2,443,737, U.S. 2,443,738, U.S. 2,443,739, U.S. 2,443,740 and U.S. 2,443,741 all of which patents are expressly incorporated herein by reference. Such resins are prepared from unsaturated polyester resins prepared from alpha, beta unsaturated poly carboxylic acids such as maleic, fumaric, aconitic, itaconic, monochloro maleic anhydride, and the like. These unsaturated acids are usually present in an amount approximating at least 20% by weight of the total weight of the polycarboxylic acids used and preferably in amounts varying between about 25% and 65% by weight based on the total weight of polycarboxylic acid present. If it is desired to make use of saturated polycarboxylic acids, that is, those which are free of non-benzeneoid unsaturation, one could use such acids as phthalic, malonic, succinic, glutaric, sebacic and chlorinated polycarboxylic acids such as tetrachlorophthalic acid, and the like, but preferably in amounts less than a larger proportion of the total amount of polycarboxylic acid present.

Whenever available, the anhydrides of these acids may be used, or mixtures of the acids or mixtures of the anhydrides thereof.

As polyhydric alcohols which may be used to prepare the unsaturated polyesters, it is preferred to make use of those alcohols having only two hydroxy groups, although minor amounts of alcohols having three hydroxy groups, four hydroxy groups, or more hydroxy groups, may be used in minor amounts. As dihydroxy alcohols, one could use ethylene glycol, diethylene glycol, propylene glycol, dipropylene glycol, butanediol 1,4; butanediol 1,3; butanediol 1,2; pentanediol 1,2; pentanediol 1,3; pentanediol 1,4; pentanediol 1,5; hexanediol 1,6; and the like. Additionally, one could use glycerol, pentaerythritol, dipentaerythritol, and the like. The esterification of the alcohol is carried out until the Acid Number of the mixture has been reduced below 55.

The modifier for polyester resins is usually a polymerizable material having a $CH_2=C<$ group. Amongst these polymerizable compounds are styrene, side chain substituted styrenes such as alpha methylstyrene, alpha ethylstyrene, and the like, or ring substituted styrene such as ortho, meta and para-alkyl styrenes such as o-methyl styrene, p-ethylstyrene, meta-propylstyrene, 2,4-dimethylstyrene, 2,5-diethylstyrene, and the like. Still further, one can make use of the allyl compounds such as diallyl phthalate, allyl alcohol, methallyl alcohol, allyl acetate, allyl methacrylate, diallyl carbonate, allyl lactate, allyl alpha-hydroxyisobutyrate, allyl trichlorosilane, allyl acrylate, diallyl malonate, diallyl oxalate, diallyl gluconate, diallyl methylgluconate, dially adipate, diallyl sebacate, diallyl tartronate, diallyl tartrate, diallyl mesaconate, diallyl citraconate, the diallyl ester of muconic acid, diallyl itaconate, diallyl chlorophthalate, diallyl dichlorosilane, the diallyl ester of endo-methylene tetrahydrophthalic anhydride, triallyl tricarballylate, triallyl aconitate, triallyl cyanurate, triallyl citrate, triallyl phosphate, trimethallyl phosphate, tetraallyl silane, tetraallyl silicate, hexallyl disiloxane, and the like.

The modifier is used in a ratio from 10 parts to 90 parts of polyester up to 60 parts to 40 parts of ester. Preferably, 25 to 35 parts of modifier is used to 65 to 75 parts of polyester.

The usage of the unsaturated amides and esters of our invention in the copolymers of our invention is usually small. A minimum of 0.01% by weight should be in the copolymer. Amounts of 0.5 to 2.0% are preferred. For special uses much larger amounts, sometimes as much as 20% can be used.

The new monomers of our invention can also be included with advantage in styrenated oil modified alkyd resins, in place of or in addition to the styrene. Such resins, which are extensively used in coatings, are very well described in U.S. 2,713,039, U.S. 2,748,092 and U.S. 2,851,431, which are expressly incorporated herein by reference for the purpose of such disclosure. These resins are essentially the reaction products of drying oils and phthalic anhydride with polyhydric alcohols, modified by reaction with styrene. The styrenation can take place before or after esterification of the acids by the alcohols or at intermediate stages. The new monomers of our invention are reacted at the same stages, just like the styrene, as desired.

It is an advantage of the new monomers of our invention that they are copolymerized much more effectively with other ethylenic monomers and polymers than polymerizable ultraviolet absorbers heretofore known. It is an advantage of the polymers of our invention that they show much greater stability to deterioration from ultraviolet light than do polymers heretofore known and that this stability can be retained through all kinds of treatment such as hot molding and even through contact with solvents which, in the past, extracted the conventional ultraviolet absorber from the polymeric composition.

Our invention can be illustrated by the following examples in which parts are by weight unless otherwise specified.

*Example 1*

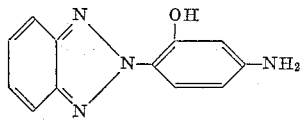

o-Nitroaniline (55.2 parts) is diazotized in the usual manner with concentrated hydrochloric acid (320 parts by volume) and sodium nitrite (27.6 parts). The excess nitrite is removed with sulfamic acid (6.0 parts). The clear diazonium chloride solution is added dropwise to a cooled solution (−5 to +5° C.) of m-aminophenol (65.6 parts) in 2000 parts by volume of water containing hydrochloric acid (120 parts by volume of 5 normal). The crude product is collected as the hydrochloride salt of the amine.

The intermediate azo compound is slurried in water and treated with dilute sodium hydroxide to obtain the free amino azo compound. This is triazolized immediately by the addition of zinc dust (78.5 parts) and sodium hydroxide (480 parts by volume of 5 normal). The crude product thus obtained is recrystallized three times from aqueous ethanol to yield orange-red needles of the amino phenylbenzotriazole.

*Example 2*

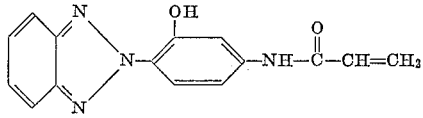

A slurry of 2.94 parts of the product of Example 1 in 75 parts by volume of monochlorobenzene is added in small portions to 1.18 parts of acrylyl chloride in 25 parts by volume of monochlorobenzene, to which 1.19 parts of pyridine and 0.1 part of hydroquinone have been added. The temperature of addition is −5 to 0° C. The mixture is stirred at this temperature for a short time and then at room temperature (25–30° C.) until the reaction is substantially complete. Recrystallization from alcohol and water and then from monochlorobenzene yields a yellow solid.

*Example 3*

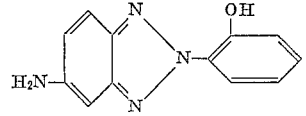

o-Aminophenol (27.3 parts) is diazotized with $NaNO_2$ (18 parts) and HCl (38 parts of real) in 250 parts by volume of water. The solution of diazonium salt is added to m-phenylenediamine (27 parts) and HCl (9.1 parts of real) in 500 parts by volume of water at 0–5° C. Concentrated sodium acetate solution then is added dropwise at 5° C. until the solution does not change Congo red paper. The mixture is stirred while warming to room temperature. The product is filtered off, washed with 10% sodium bicarbonate solution and water.

Oxidative triazolization of the resulting azo dye is carried out in a solution of $CuSO_4.5H_2O$ (310 parts) in water (750 parts by volume), methanol (750 parts by volume) and ammonium hydroxide (1,250 parts by volume). The product isolated from this step is treated with boiling zinc and glacial acetic acid to destroy unreacted azo. The zinc is removed and the filtrate is drowned in water. The brown solid product is collected by filtration and recrystallized twice from alcohol.

*Example 4*

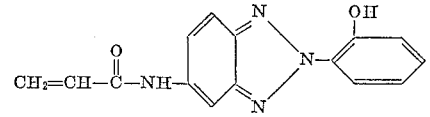

The procedure of Example 2 is followed using the product of Example 3 in place of the product of Example 1, the product has the above structure.

*Example 5*

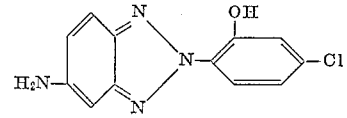

The procedure of Example 3 is followed using 4-chloro-2-aminophenol in place of the ortho-aminophenol. Similarly, the correspondingly substituted aminohydroxyphenylbenzotriazole is obtained, when 3,5-dibromo-2-aminophenol, 6-methyl-2-aminophenol, 6-methyl-4-bromo-2-aminophenol, 4,5-dimethyl-2-aminophenol, 5-methoxy-2-aminophenol, 5-ethoxy-2-aminophenol, 5-methyl-2-aminophenol or 2-amino-5-methylresorcinol is used.

*Example 6*

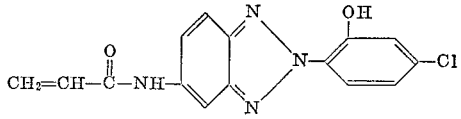

The procedure of Example 2 is followed using the product of Example 5 instead of the product of Example 1 in equivalent amounts. Similarly, when the other products described in Example 5 are used the correspondingly substituted acrylamido 2-hydroxyphenylbenzotriazole is obtained.

*Example 7*

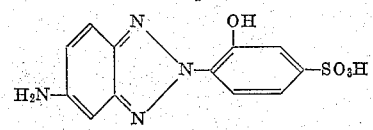

The procedure of Example 3 is followed using 3-amino-4-hydroxybenzene sulfonic acid in place of the ortho-aminophenol except that the final product is salted out of the drowned filtrate. Similarly, the correspondingly sub-situted compounds are obtained when 3-amino-4-hydroxy-5-chlorobenzesulfonic acid or 3-amino-4-hydroxy-5-methylbenzenesulfonic acid are used.

*Example 8*

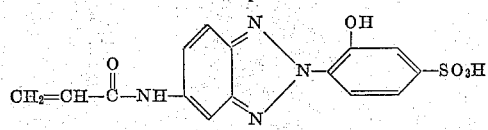

A mixture of 30.6 parts of the product of Example 7 with 20 parts of acrylyl chloride in 400 parts of water containing 25 parts of sodium hydroxide is stirred until no further test for free amino group is obtainable. If necessary, additional acrylyl chloride is added. The product is then isolated as the sodium salt by salting, filtering and drying.

*Example 9*

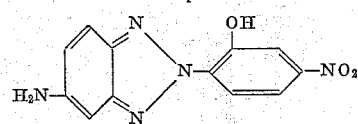

The procedure of Example 3 is followed using in place of the ortho-aminophenol and equivalent quantity of 4-nitro ortho-aminophenol. The treatment with zinc glacial acetic acid is omitted and purification is effected solely by recrystallization. When the treatment with zinc and glacial acetic acid is used instead, the corresponding nitro group is reduced and the corresponding diamine is obtained.

Similarly, other correspondingly substituted nitroaminophenylbenzotriazoles and diaminophenylbenzotriazoles are obtained when 6-chloro-4-nitro-2-aminophenol, 4-chloro-5-nitro-2-aminophenol and 4-nitro-6-methyl-2-aminophenol are used.

*Example 10*

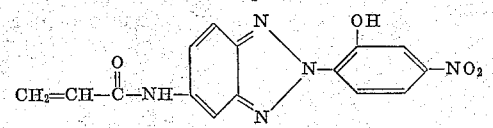

The procedure of Example 2 is carried out on the nitro compound formed in Example 9, using the said nitro compound in place of the product of Example 1 but in equivalent quantities. The product of the above structure is obtained.

*Example 11*

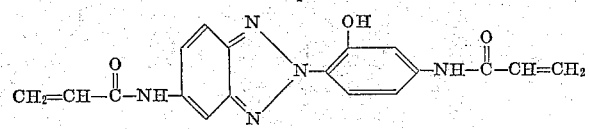

The procedure of Example 2 is followed using the diamino phenylbenzotriazole described in Example 9 in place of the product of Example 1 and in half the equivalent quantity.

*Example 12*

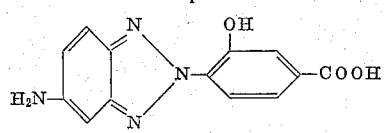

The procedure of Example 3 is followed using 4-amino-3-hydroxybenzoic acid in equivalent quantities in place of the orthoaminophenol.

*Example 13*

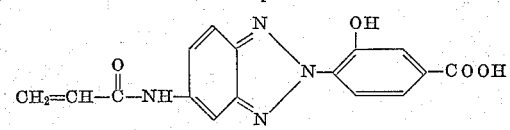

The procedure of Example 8 is followed using the product of Example 12 in equivalent quantities in place of the product of Example 7.

*Example 14*

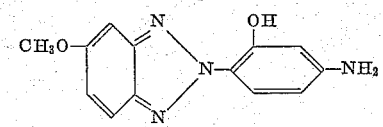

The procedure of Example 1 is followed using in place of ortho-nitroaniline an equivalent quantity of 5-methoxy-ortho-nitroaniline. Similarly, other correspondingly substituted amino benzotriazole derivatives are obtained when 6-methoxy-ortho-nitroaniline-4-ethoxy - ortho - nitroaniline, 5-hydroxy-ortho-nitroaniline, 4-chloro-ortho - nitroaniline, 4-chloro-6-bromo-ortho-nitroaniline or 3,4,6-trichloro-ortho-nitroaniline are used.

*Example 15*

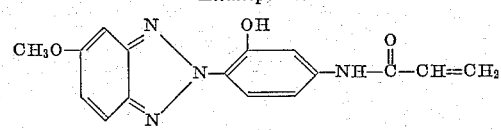

The procedure of Example 2 is followed using an equivalent quantity of the product of Example 14 in place of the product of Example 1. Similarly, when the other substituted phenyl benzotriazoles described in Example 14 are used in place of the product of Example 1 the correspondingly substituted acrylamido phenyl benzotriazole is obtained.

*Example 16*

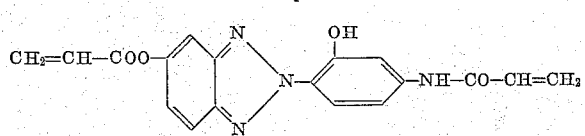

The procedure of Example 2 is followed using the product of Example 14 obtained when 5-hydroxy-o-nitroaniline is used as a starting material. This product of Example 14 is used in half the equivalent of the amount of the product of Example 1 used in Example 2.

*Example 17*

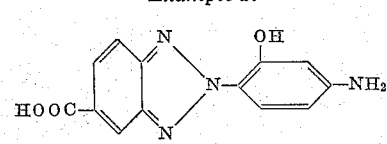

The procedure of Example 1 is followed using an equivalent quantity of 3-nitro-4-aminobenzoic acid in place of the ortho-nitroaniline. The product is isolated by acidification after the triazolization procedure.

Similarly, other correspondingly substituted aminohydroxyphenylbenzotriazoles are obtained when 3-nitrosulfonic acid and 3-nitroanthranilic acid are used.

Example 18

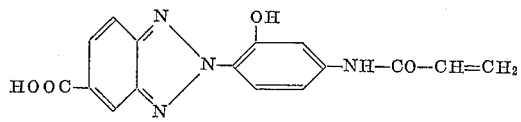

The procedure of Example 8 is used, using a quantity of the product of Example 17 equivalent to the quantity of the product of Example 7 used in Example 2. Similarly, when the other products disclosed in Example 17 are used in place of the product of Example 7, the correspondingly substituted acrylamido phenyl benzotriazole is obtained.

Example 19

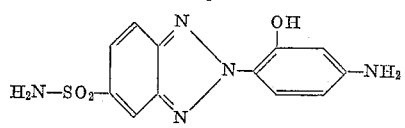

The procedure of Example 1 is followed using an equivalent quantity of 3-nitrosulfanilamide in place of ortho-nitroaniline. Similarly, other correspondingly substituted hydroxyaminophenylbenzotriazoles are obtained when 4-iodo-ortho-nitroaniline-5-methyl-ortho-nitroaniline are used in place of ortho-nitroaniline.

Example 20

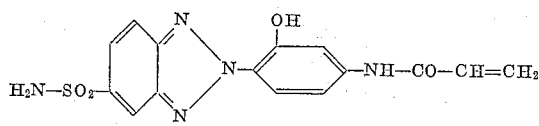

The procedure of Example 2 is followed using in place of the product of Example 1 an equivalent quantity of the product of Example 19.

Example 21

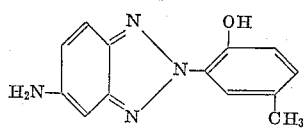

17.5 parts of sodium nitrite is added to 675 parts of concentrated sulfuric acid at room temperature. After the mixture is cooled to room temperature, 42 parts of 2,4-dinitroaniline is added slowly while the temperature of the mixture is maintained at 30 to 35° C. After diazotization is complete, this mixture is poured onto ice. The resulting solution is added to a cooled slurry of 27 parts of p-cresol, 563 parts of sodium hydroxide and 1000 parts of water while cooling in an ice bath. The mixture is allowed to stir while warming slowly to room temperature. The mixture is neutralized with HCl and the azo dye is filtered.

The dye is added to 1000 parts of 5 N NaOH. 100 parts of powdered zinc is added and this mixture is stirred and heated at 90° C. until the reaction is substantially complete. The mixture is filtered and the filtrate is neutralized with HCl. The tan solid is filtered and treated with hot glacial acetic acid and powdered zinc. The zinc is filtered off and the filtrate is flooded with water. The solid which forms is filtered off.

Example 22

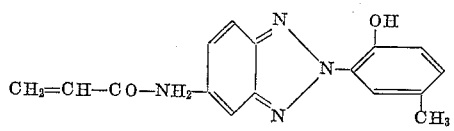

The procedure of Example 2 is followed using in place of the product of Example 1 an equivalent quantity of the product of Example 21.

Example 23

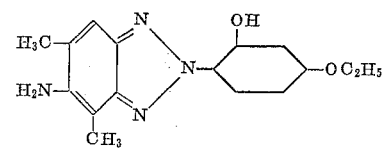

The procedure of Example 3 is followed using an equivalent quantity of 2,4-dimethylmetaphenylene diamine in place of the meta-phenylenediamine and an equivalent quantity of 5-ethoxy-ortho-aminophenol in place of ortho-aminophenol.

Example 24

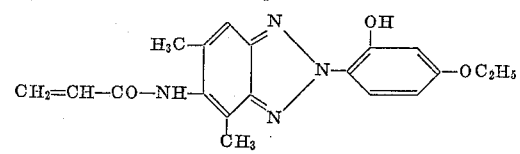

The procedure of Example 2 is followed using in place of the product of Example 1, an equivalent quantity of the product of Example 23.

Example 25

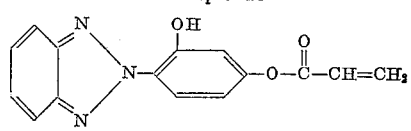

Acrylyl chloride (4.53 parts) is added dropwise to a solution of 2-(2,4-dihydroxyphenyl)benzotriazole (11.4 parts) in 100 parts by volume of water containing 2.0 parts of sodium hydroxide at 0–5° C. Stirring is continued until the reaction is substantially complete. The solid is collected by filtration and recrystallized from alcohol.

Example 26

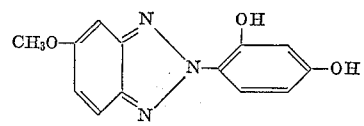

The procedure of Example 1 is followed using an equivalent quantity of resorcinol in place of the meta-amino-phenol and using an equivalent quantity of 5-methoxy-orthonitroaniline in place of the orthonitroaniline. Similarly, other correspondingly substituted benzotriazole derivatives are obtained when 6-methoxyorthonitroaniline, 4-ethoxyorthonitro aniline, 5-hydroxyorthonitro analine, 4-chloro orthonitro aniline, 4-chloro-6-bromoorthonitro aniline, 3,4,6-trichloroorthonitro aniline, 3-nitrosulfonylic acid and 3-nitroanthranilic acid, 3-nitrosulfonanilimide, 4-iodo-orthonitro aniline, 5-methylorthonitro aniline are used in place of orthonitro aniline.

Example 27

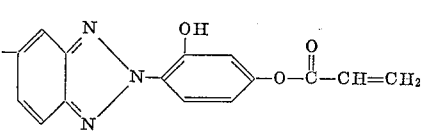

The procedure of Example 25 is followed using a half equivalent amount of the trihydroxyphenylbenzotriazole described in Example 26, being the product from 5-hydroxyorthonitro aniline and resorcinol, in place of the dihydroxy compound used in Example 25.

Example 28

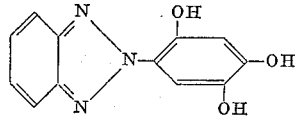

The procedure of Example 1 is followed using in place of meta amino phenol an equivalent quantity of 2-hydroxy hydroquinone. When hydroquinone is used in place of the hydroxyhydroquinone, in equivalent quantity, the corresponding dihydroxy compound is obtained.

*Example 29*

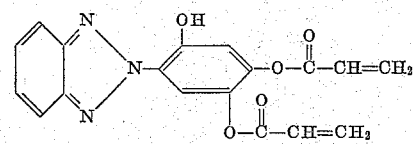

The procedure of Example 25 is followed using a half equivalent quantity of the product of Example 28, in place of the 2,4-dihydroxyphenylbenzotriazole. When the product of Example 28 using hydroquinone is used in place of the trihydroxy compound in full equivalent quantity to Example 25, the product isomeric to that of Example 25 is obtained.

*Example 30*

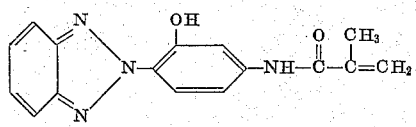

The procedure of Example 2 is followed using in place of acrylyl chloride an equivalent quantity of methacrylyl chloride. Similarly, the corresponding undecylenylamino phenyl benzotriazole is obtained when undecylenyl chloride is used in place of the acrylyl chloride. In the same way, when either of these acid chlorides are used in the procedures of Examples 4, 6, 8, 10, 11, 13, 15, 16, 18, 20, 22, and 24 in place of acrylyl chloride, the correspondingly substituted acylaminobenzotriazole results.

*Example 31*

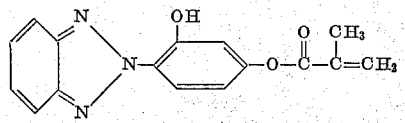

The procedure of Example 25 is followed using an equivalent quantity of methacrylyl chloride in place of the acrylyl chloride. Similarly, the corresponding ester is obtained when the acrylyl chloride is replaced with an equivalent quantity of undecylenyl chloride. In the same way, when either of these acid chlorides is substituted for acrylyl chloride in equivalent amounts in the procedures of Examples 25, 27 or 29, the corresponding acyloxybenzotriazole is formed.

*Example 32*

A mixture of 9 parts of styrene and about 1 part of the compound of Example 2 is heated in the presence of 0.1 part of benzoyl peroxide as a catalyst at 80° C. for about 8 hours and 100° C. for about 72 hours in a closed container.

The resulting copolymer is added to benzene and after complete solution, it is precipitated by the addition of an excess of ethanol. After removal it is further extracted with ethanol to remove unreacted benzotriazole compound from the formed copolymer.

*Example 33*

0.5 gram of the product of Example 2 and 0.05 gram of benzoyl peroxide are placed in a Pyrex tube. 4.5 grams of styrene is added. The tube is flushed with nitrogen then sealed. The mixture is heated at 120° C. for 100 hours. The copolymer is dissolved in toluene and precipitated in an excess of alcohol. It is then given several washings with hot alcohol. A spectrophotometric analysis shows 75 milligrams of the product of Example 2 per gram of copolymer. The efficiency of copolymerization is 75%.

A small amount of the copolymer is dissolved in hot toluene. This solution is brushed on a white pine panel. A very thin film is formed on the surface of the wood. A control sample is prepared by dissolving polystyrene in hot toluene and brushing this solution on a white pine panel. These two panels, along with a third panel which has no overcoating, are exposed in a Fade-Ometer for 14 hours. Both control samples become badly discolored, while the sample containing the UV absorbing copolymer shows only a slight discoloration.

When the products of Examples 4, 6, 8, 10, 13, 15, 20, 22, 24, 25, 30, or 31 are used in place of the product of Example 2, similar products are obtained.

*Example 34*

The copolymer of Example 33 is milled into polystyrene in the proportion of 5 parts to 95 parts of polystyrene, to give a blend containing almost 0.5% of the benzotriazole comonomer in the mixture. Molded pieces of the blend show improved resistance to exposure in the Fade-Ometer, compared to polystyrene.

*Example 35*

The procedure of Example 32 is followed using 9.95 parts of styrene and 0.5 part of the compound of Example 4. The resulting copolymer shows enhanced resistance of UV light, compared to pure polystyrene.

*Example 36*

A solution of 2.4 parts of dihexyl sodium sulfosuccinate and 0.13 part of sodium bicarbonate in 165 parts of deionized water is heated to 90° C. while maintaining a nitrogen atmosphere. There is then added gradually 36 parts of acrylonitrile, 74 parts of styrene, and 10 parts of the product of Example 25. At the same time there is added 2.4 parts of $(NH_4)_2S_2O_8$ in 15 parts of water in several portions. After the reaction is complete, excess acrylonitrile and styrene are removed by steam distillation. The polymer is coagulated, washed, and dried. This polymer is used in conjunction with alkyd resins to form surface coatings.

2.5 parts of the above tripolymer is milled into 97.5 parts of styrene-acrylonitrile (84:36) copolymer and molded into 50 mil chips. These, along with unmodified styrene acrylonitrile (84:36) chips are exposed in the weatherometer. The control becomes discolored while the material containing the UV absorbing comonomer shows little change.

When the compounds of Examples 2, 4, 6, 8, 10, 13, 15, 20, 22, 24, 30 or 31 are used in place of that are used in place of that of Example 25, similar results are obtained.

*Example 37*

A mixture of 95 parts of a resin mixture comprising a polyester of excess propylene glycol with equal mole quantities of phthalic and maleic anhydrides, blended with 50% of its weight of styrene, 4.75 parts of additional styrene, 0.25 part of the product of Example 31 and 0.50 part of benzoyl peroxide is poured into a mold made of glass plates and cured in an oven for 30 minutes at 80° C., 30 minutes at 105° C., and 1 hour at 120° C. The product is an ultraviolet light resistant resin composition.

When the products of Examples 2, 4, 6, 8, 10, 13, 15, 20, 22, 24, 25 or 30 are used in place of that of Example 31, similar products are obtained.

*Example 38*

A mixture of 4 parts of $(NH_4)_2S_2O_8$, 12 parts of sodium cetylsulfate and 800 parts of water is adjusted to pH of 8 with sodium hydroxide. Nitrogen is bubbled through the solution for a short time. Then, 320 parts of butylmethacrylate and 80 parts of the product of Example 25 are added and a slow stream of nitrogen is passed over the surface. The temperature is raised to 55° C. and held there until the reaction is substantially complete. The polymer is separated by freezing the latex and is washed with water and dried at 45° C. This copolymer, in combination with ethyl cellulose or nitrocellulose, can be used as a wood-finishing lacquer or as a coating for fabrics.

When the products of Examples 2, 4, 6, 8, 13, 15, 20, 22, 24, 30 or 31 are used in place of that of Example 25, similar products are obtained.

*Example 39*

A reaction mixture containing 7 parts of butyl methacrylate, 0.5 part of the product of Example 25, 0.075 part of stearic acid, 0.04 part of benzoyl peroxide, 0.06 part of the sodium salt of polyacrylic acid, 0.19 part of sodium sulfate in 24 parts of water is flushed with nitrogen and then maintained at 120° C. for several hours with stirring. The copolymer is collected and dried.

When the products of Examples 2, 4, 6, 8, 10, 13, 15, 20, 22, 24, 30 or 31 are used in place of that of Example 25, similar products are obtained.

*Example 40*

A mixture of 2 parts of the product of Example 11 and 98 parts of methylmethacrylate with a small amount of benzoyl peroxide as a catalyst is heated in Sheet-cells at 60° C. for 30 hours, followed by 10 hours at 125° C. The resulting polymer is resistant to discoloration by UV light.

When the products of Examples 16, 18, 27 or 29 are used in place of that of Example 11, similar products are obtained.

*Example 41*

The following emulsion is agitated at 40° C. for about 5 days:

| | Parts |
|---|---|
| Acrylamide | 25 |
| 1,3-butadiene | 74.5 |
| Product of Example 11 | 0.5 |
| Sodium palmitate | 5 |
| Diazoaminobenzene | 0.75 |

The resulting latex like dispersion is coagulated whereupon a soft elastic polymer is obtained.

*Example 42*

A mixture of 75 parts of butadiene, 24.5 parts of styrene, 0.5 part of the product of Example 4, 0.5 part of dodecylmercaptan, 180 parts of water, 0.3 part of potassium persulfate, and 5.0 parts of sodium stearate is stirred vigorously to form an emulsion. The emulsion is autoclaved and maintained at 50° C. for 16 hours. The resulting latex is treated with sodium chloride solution followed by addition to a dilute sulfuric acid bath. The crumbs that are formed are filtered, washed and dried at 60° C.

We claim:

1. Compounds of the formula $$\left[ \text{(R}_1\text{)}_m \text{—benzotriazole—N—phenyl(OH)(R}_2\text{)}_n \right] \text{(R}_3\text{)}_p \text{(R}_4\text{)}_q$$

in which $R_1$ and $R_2$ are selected from the group consisting of lower alkyl, lower alkoxy, halogen, nitro, carboxy, sulfonic acid and sulfonamido, $R_3$ is a member selected from the group consisting of acrylylamino and methacrylylamino, $R_4$ is a member selected from the group consisting of acrylyloxy and methacrylyloxy, $m$ and $n$ are integers less than three, $p$ and $q$ are integers greater than minus one and less than four, at least one of $p$ and $q$ being greater than zero, $R_3$ and $R_4$ being bonded directly to carbocyclic aromatic rings in the said phenylbenzotriazole nucleus.

2. The compound

[benzotriazole-N-phenyl(OH)-NH-C(O)-CH=CH$_2$]

3. The compound

[CH$_2$=CH-C(O)-HN-benzotriazole-N-phenyl(OH)]

4. The compound

[benzotriazole-N-phenyl(OH)-O-C(O)-CH=CH$_2$]

5. The compound

[benzotriazole-N-phenyl(OH)-O-C(O)-CH=CH$_2$]

6. The compound

[benzotriazole-N-phenyl(OH)-(O-C(O)-CH=CH$_2$)$_2$]

7. The compound

[benzotriazole-N-phenyl(OH)-NH-C(O)-C(CH$_3$)=CH$_2$]

8. The compound

[benzotriazole-N-phenyl(OH)-O-C(O)-C(CH$_3$)=CH$_2$]

References Cited in the file of this patent

UNITED STATES PATENTS

| | | |
|---|---|---|
| 1,975,383 | Zitseher | Oct. 2, 1934 |
| 2,362,988 | Conzetti et al. | Nov. 21, 1944 |
| 2,609,353 | Rubens et al. | Sept. 2, 1952 |
| 2,800,486 | Grundman et al. | July 23, 1957 |
| 2,894,932 | Bader et al. | July 14, 1959 |
| 2,938,883 | Raich | May 31, 1960 |
| 2,940,815 | Faras et al. | June 14, 1960 |
| 3,076,782 | Mohr et al. | Feb. 5, 1963 |

FOREIGN PATENTS

| | | |
|---|---|---|
| 563,210 | Belgium | June 13, 1958 |
| 1,195,307 | France | May 19, 1959 |

UNITED STATES PATENT OFFICE
CERTIFICATE OF CORRECTION

Patent No. 3,159,646                December 1, 1964

Jerry P. Milionis et al.

It is hereby certified that error appears in the above numbered patent requiring correction and that the said Letters Patent should read as corrected below.

Column 3, line 57, for "2-amino-4-methylphonol" read -- 2-amino-4-methylphenol --; column 4, line 13, for "Methaphenylenediamine" read -- Metaphenylenediamine --; column 5, line 46, for "5-chloro-2-hyrdoxybenzenesulfonic acid" read -- 5-chloro-2-hydroxybenzenesulfonic acid --; line 59, for "esterefy" read -- esterify --; column 6, line 1, for "phenol" read -- phenyl --; column 7, line 2, for "dially" read -- diallyl --; line 16, for "coplymers" read -- copolymers --; column 9, line 42, for "and" read -- an --; column 12, line 51, for "analine" read -- aniline --; column 15, lines 59 to 63, the left-hand portion of the formula reading:

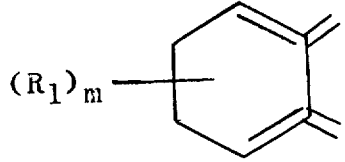                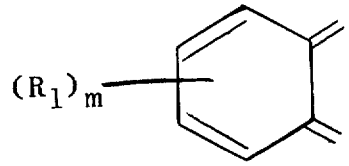

Signed and sealed this 20th day of April 1965.

(SEAL)
Attest:

ERNEST W. SWIDER
Attesting Officer

EDWARD J. BRENNER
Commissioner of Patents